Sept. 24, 1963   E. M. WIGHT   3,104,460
DEVICES FOR DISASSEMBLING MACHINE PARTS
Filed Jan. 25, 1960   2 Sheets-Sheet 1
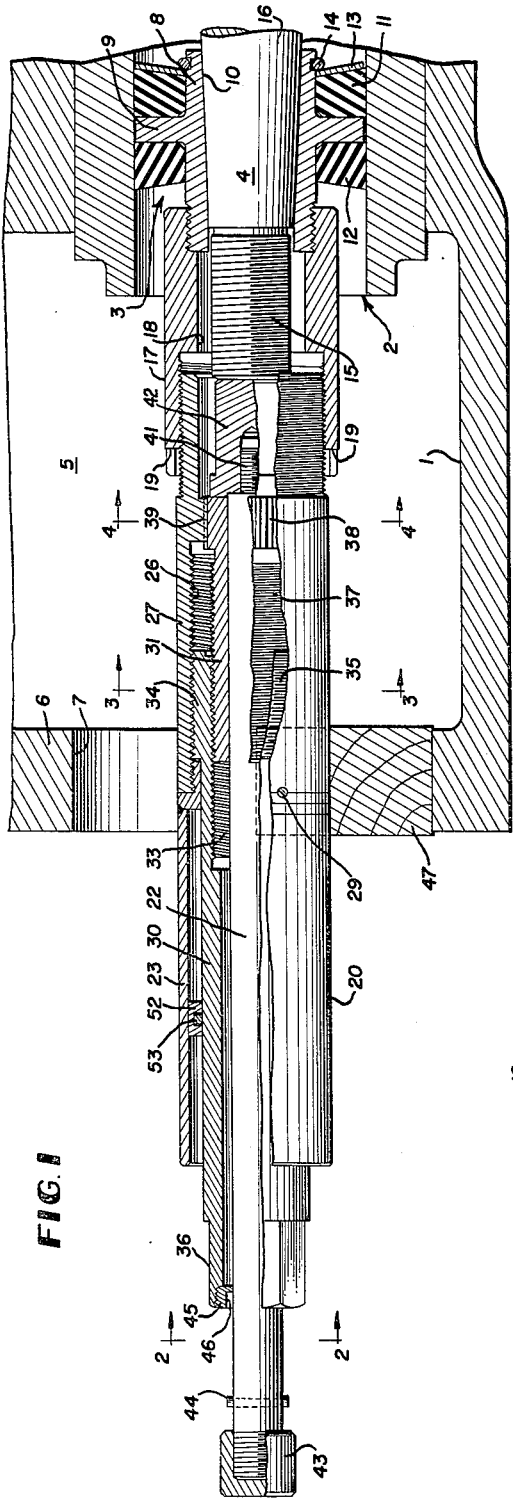
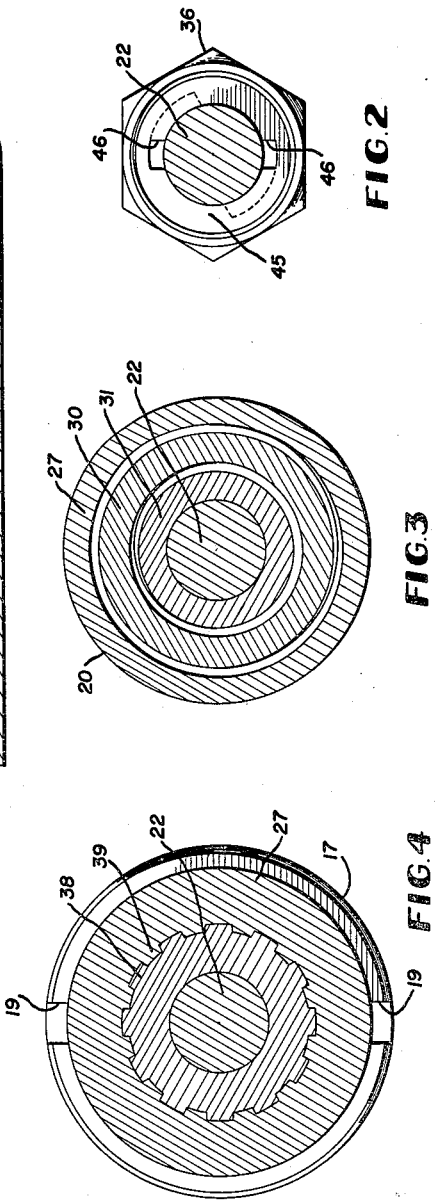
INVENTOR.
EDWARD M. WIGHT
BY Tom Arnold
D C Roylance
ATTORNEYS Sept. 24, 1963
E. M. WIGHT
3,104,460
DEVICES FOR DISASSEMBLING MACHINE PARTS
Filed Jan. 25, 1960
2 Sheets-Sheet 2
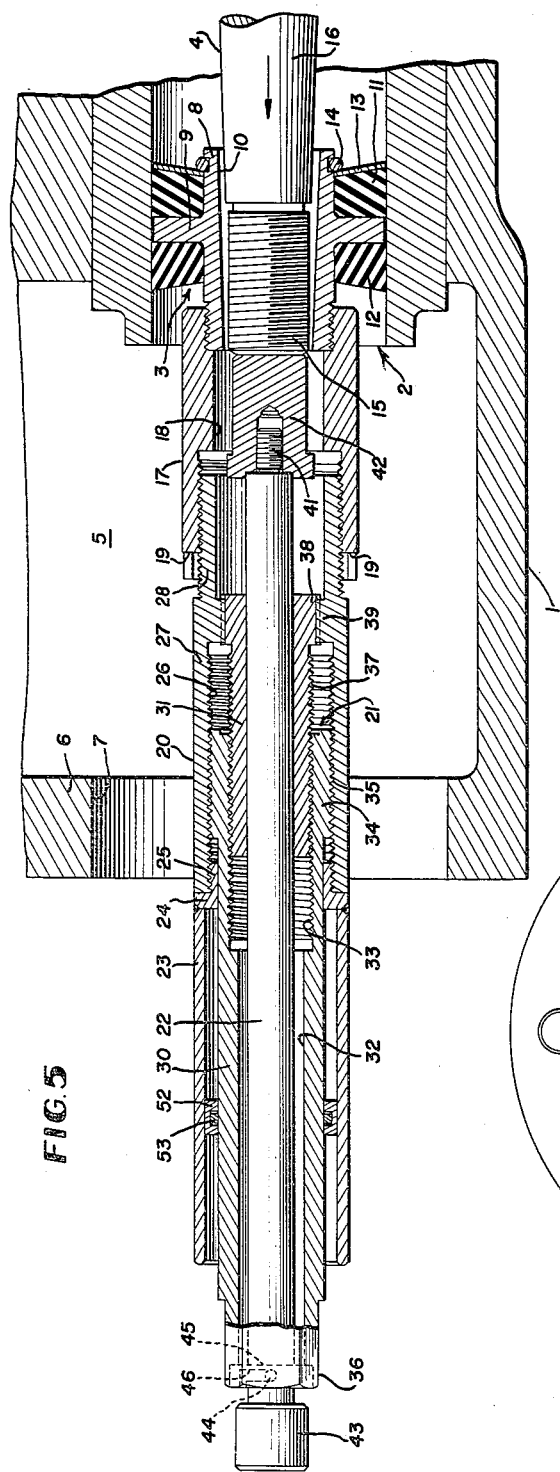
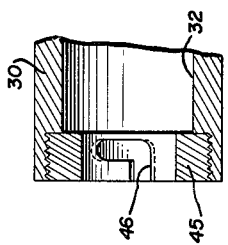
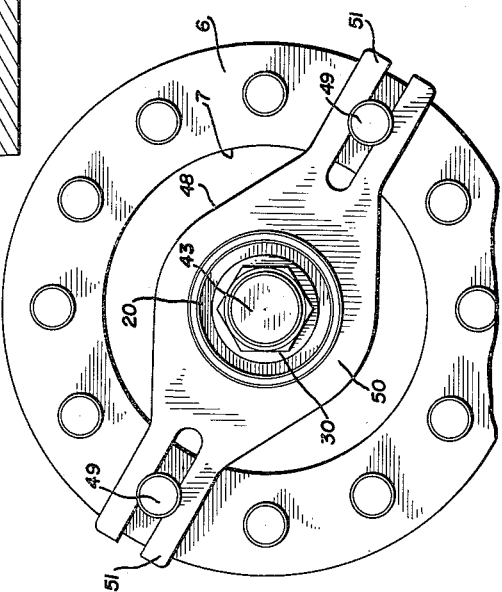
INVENTOR.
EDWARD M. WIGHT
BY Tom Arnold
D.C. Roylance
ATTORNEYS

United States Patent Office 3,104,460
Patented Sept. 24, 1963

3,104,460
DEVICES FOR DISASSEMBLING
MACHINE PARTS
Edward M. Wight, Austin, Tex., assignor to
Tom S. Gillis, Houston, Tex.
Filed Jan. 25, 1960, Ser. No. 4,408
12 Claims. (Cl. 29—264)

This invention relates to devices for disassembling machine parts and is particularly applicable to devices for freeing and removing such machine parts as pistons, gears, etc., from their supporting rods, shafts or the like. While not limited thereto, the invention has particular application to the removal of a pump piston assembly.

In the oil well industry, piston-type slush pumps are used for pumping mud and similar materials. After prolonged periods of use, it is frequently necessary to remove the piston assembly for servicing or replacement of the assembly or parts thereof. However, it is likely that the contacting surfaces of the piston assembly and the piston rod will have become so tightly wedged, frozen or stuck together that forces as high as 100,000 pounds are necessary to separate the piston assembly and the piston rod.

The invention provides a device for disassembling machine parts and wherein screw means are employed to develop the force to be applied to the machine parts. It is well known that an ordinary screw develops a high axial force when a relatively lower force, applied through a suitable torque radius, tends to rotate the screw. This axial force is increased by constructing the screw with a small helix angle and hence a small pitch, but this provides a weak thread. To minimize the difficulty and yet produce the large force necessary to effect separation of the machine parts, the invention utilizes a differential screw device.

Accordingly, one of the objects of this invention is to provide improved means including a differential screw for separating two machine parts or assemblies stuck together.

Another object of this invention is to provide a pulling tool capable of developing a high force, on the order of 100,000 pounds, for example, for separating and removing a piston or piston assembly from a piston rod in a slush pump or the like.

A problem often encountered is that even such high forces are insufficient to separate the piston assembly and the piston rod. Consequently, another object of this invention is to provide means for developing a high force and means for imparting a sudden or jarring force to rupture the bond by which the parts are stuck together.

After the piston and the piston rod have been separated, it often happens that the piston assembly is stuck in the cylinder and therefore cannot be removed by ordinary means, even though free from the piston rod; therefore, another object of this invention is to provide, in a device of the type described, means for aiding in the removal of the piston assembly from the cylinder.

In order that the manner in which these and other objects are attained, in accordance with the invention, can be understood in detail, reference is had to the accompanying drawings, which form a part of this specification, and wherein:

FIG. 1 is a side elevational view, partly in section and with portions broken away for clarity, illustrating an embodiment of this invention in position for separating a piston and a piston rod;

FIGS. 2–4 are transverse sectional views taken along reference lines 2—2, 3—3 and 4—4, respectively, of FIG. 1;

FIG. 5 is a side elevational view, similar to FIG. 1, illustrating the embodiment of this invention in position to aid in the removal of the piston assembly from its cylinder;

FIG. 6 is a fragmentary longitudinal sectional view, on an enlarged scale, illustrating in detail a portion of the device of FIG. 1; and FIG. 7 is an end elevational view illustrating an alternative means for supporting the device shown in FIG. 1.

Referring now to the drawings, there is shown in FIGS. 1 and 5, for the purpose of clarity in describing this invention, portions of a typical slush pump to which the invention can be applied for removal of a piston assembly. The slush pump includes a casing 1 having a cylinder 2 secured therein in which a piston assembly 3 is driven by a reciprocating piston rod 4, in the usual fashion, to circulate fluid through a fluid passageway 5.

Casing 1 includes a cylinder head support flange 6 having a cylindrical bore 7 extending therethrough, the axes of bore 7 and cylinder 2 being in alignment. Flange 6 is spaced from cylinder 2, and passageway 5 lies therebetween.

Piston assembly 3 comprises a tubular piston hub 8 having a medial outwardly extending flange 9 and a tapered axial bore 10. A pair of deformable piston rings 11 and 12 are mounted on opposite sides of flange 9. The right piston ring 11 is held in place by an annular retaining plate 13 and a retaining ring 14. The left end of hub 8, as viewed, is externally threaded and provides means for attaching a nut and a retaining plate (not shown) for holding piston ring 12 in place.

Piston rod 4 is provided with an externally threaded end 15 and a portion 16 tapering toward passageway 5. When the piston assembly 3 is connected to piston rod 4, the threaded end 15 extends through and projects beyond the left end of hub 8 and the tapered portion 16 is seated within tapered axial bore 10. A nut (not shown) is threadedly received on end 15 to hold the piston assembly 3 in place on rod 4.

In order to remove piston assembly 3, the nut for holding piston assembly 3 in position on piston rod 4, and the nut and retaining plate for holding piston ring 12 in place have to be removed to allow relative movement between the piston hub 8 and piston rod 4 and to expose the threaded end of hub 8 so that a pulling tool can be attached to the hub.

In the embodiment shown in the drawings, the pulling tool of this invention includes a tubular adaptor 17 having an axial bore 18 which is counterbored and internally threaded at each end. At its left end, as viewed, adaptor 17 is provided with a pair of diametrically opposed slots 19 into which a suitably formed wrench can be inserted for attaching adaptor 17 to piston assembly 3 by screwing adaptor 17 onto the threaded end of piston hub 8.

The pulling tool also includes an elongated tubular outer body 20, differential screw means 21 and a sledging rod 22. The tubular outer body 20 comprises a cylindrical tube 23 secured at its right end to a stop ring 24, as for example by welding. Ring 24 includes an externally threaded tubular hub 25 on which is threadedly received an internally threaded end portion 26 of a tubular member 27.

At its right end, member 27 is provided with an externally threaded portion 28 which, after adaptor 17 is connected to the piston assembly 3, is screwed into the left end of adaptor 17. Tubular outer body 20 can be provided with a knurled portion (not shown) to aid in attaching it to adaptor 17.

Tubular member 27 and tube 23 are prevented from rotating relative to each other by a machine screw 29 set in a suitably formed aperture drilled at the interface of ring 24 and member 27.

Differential screw means 21 comprises an elongated, generally tubular differential element 30 and a tubular power element 31. The differential element 30 is provided with an axial bore 32 which is counterbored and threaded at its right end to form an internally threaded portion 33. Differential element 30 is also provided, at its right end, with a portion 34 of increased wall thickness, portion 34 being externally threaded as seen at 35. The external threads of portion 34 are in operative engagement with the internal threads of bore 26. The left end of differential element 30 extends axially beyond the left end of outer body 20 and includes an exposed hexagonal end portion 36 by means of which differential element 30 can be rotated for a purpose described hereinafter. The outward axial movement of differential element 30 is limited by the position of the right end of stop ring 24.

Power element 31 is provided with an externally threaded portion 37 operably engaged with threaded portion 33 of differential element 30. The right end of power element 31 comprises an externally splined portion 38 which operably engages an inwardly extending splined portion 39, as best seen in FIG. 4, to provide a connection between power element 31 and outer body 20, which connection is effective to prevent relative rotation between power element 31 and body 20 but allows axial sliding movement therebetween. Portion 39 is formed on tubular member 27 intermediate the ends thereof.

The threads of threaded portions 33 and 35 of differential element 30 are of the same hand but of slightly different pitch, the outer thread having the greater lead. The threads of bore 26 and threaded portion 37 are of the same hand and pitch as the threads of element 30 with which they are respectively engaged. Consequently, rotation of differential element 30 relative to outer body 20 and power element 31 produces a differential effect or action, that is, rotation of differential element 30 relative to outer body 20 and power element 31 causes power element 31 to move axially an amount proportioned to the lead difference between the threads.

Disposed coaxially with respect to adaptor 17, sledging rod 22 is rotatable and slidable within the bore of power element 31. At its right end, rod 22 is provided with an axially extending threaded stud 41 to which is attached an extension 42. The left end of extension 42 provides an abutment surface for engagement with the right end of power element 31 for limiting movement of rod 22 to the left.

The left end of rod 22 extends axially beyond the left end of differential element 30 to provide an exposed end on which a cap 43 is secured. Adjacent to the left end of rod 22, a pin 44 is secured to rod 22 and extends transversely therethrough along a diametrical line. The length of pin 44 is greater than the diameter of rod 22 and both ends of the pin project from the rod. At its left end, element 30 is provided with a threaded counterbore in which an annular ring 45 is disposed. Ring 45 is provided with a pair of diametrically opposed L-shaped slots 46 dimensioned to receive the ends of pin 44 for locking rod 22 in a limiting position to prevent axial movement of the rod relative to element 30 for a purpose described hereinafter.

To remove piston assembly 3, adaptor 17 is screwed onto hub 8 in the manner previously described. Then, outer body 20 is screwed into adaptor 17 until extension 42, having previously been fully screwed onto threaded stud 41, abuts both power element 31 and piston rod 4, as shown in FIG. 1, to transmit force therebetween. Thereafter, by applying a suitable torque to differential element 30, a force is developed which tends to cause relative axial movement between piston assembly 3 and piston rod 4. Since piston rod 4 is held stationary by its drive means, this force tends to pull piston assembly 3 off of piston rod 4. As best seen in FIG. 1, this force is transmitted from power element 31 through extension 42 to piston rod 4 and from tubular member 27 through adaptor 17 to piston hub 8. Should this force be insufficient to cause relative movement between piston assembly 3 and piston rod 4, cap 43 can be struck with a sledge hammer to impart a jarring axial force to piston rod 4 to rupture the bond holding piston assembly 3 and piston rod 4 together. In some instances, such a blow or jarring force causes extension 42 to move from engagement with the end of power element 31. Thereafter, differential element 30 is rotated until piston assembly 3 can be removed from cylinder 2 or until piston rod 4 can be retracted into cylinder 2 free from the piston assembly.

In the event piston assembly 3 is stuck in cylinder 24 after being freed from the piston rod and therefore, cannot be removed manually, piston rod 4 is retracted into cylinder 2 by operation of the pump. Then, rod 22 is pushed into the differential element and is locked against axial movement relative to differential element 20 by suitable engagement of pin 44 within slots 46 of ring 45, as shown in FIG. 5. In this position, extension 42 is adapted to be engaged by piston rod 4 at a point to the right of the extreme left position of piston rod 4 so that subsequent outward movement of piston rod 4 produces a force which is transmitted through the pulling tool and which moves piston assembly 3 out of cylinder 2.

In one embodiment of this invention and by way of example only for the purpose of illustrating the differential action, the differential element is constructed with an outer thread of 4½ threads per inch and with an inner thread of 5 threads per inch. That is, the outer thread has the greater lead. Thus, one revolution of the differential element will move the power element an amount proportional to the lead difference, i.e., 1/4½ − 1/5, or 1/45 inch per revolution. Obviously, this is the same movement as would be obtained using a single screw having a thread of 45 threads per inch. With such an arrangement, it has been found that the weights of two men on a 6-foot wrench turning the differential element exert a force on the piston assembly which is on the order of 100,000 pounds.

Since the pistons of many piston-type slush pumps move in horizontal planes, it is necessary to support the pulling tool in a horizontal plane to exert axial forces on the piston rod. When the pulling tool is in the position shown in FIG. 1, the weight of the tool tends to pivot the left end downwardly. Furthermore, when a torque is applied to rotate the differential element 30, a force is usually applied which further tends to pivot the left end of the pulling tool downwardly. Consequently, it is advantageous to support the left end of the pulling tool during removal of the piston assembly so that all the forces tending to remove the piston assembly are exerted in an axial direction.

To support the left end of the pulling tool, two means are shown. The first means, as shown in FIG. 1, comprises a wooden bearing block 47 having the shape of one-half of an annular ring. Block 47 is disposed in bore 7 beneath outer body 20 so that the left end of the pulling tool is supported by the support flange 6.

The second means, as shown in FIG. 7, comprises a support plate 48 having a central body portion 50 and a pair of diametrically opposed, radially extending bifurcated arms 51. The body portion 50 is provided with a circular opening through which outer body 20 passes. A plurality of bolts or studs are fastened to flange 6 and include a pair of diametrically opposed bolts 49 which are engaged in the bifurcated ends of arms 51 to support the left end of the pulling tool.

To maintain the axes of differential element 30 and outer body 20 in alignment, an annular grooved ring 52 is secured to the inner wall of tube 23 adjacent to the left end thereof. The inner wall of ring 52 has substantially the same diameter as and bears against the outer wall of element 30. In the groove of ring 52 is disposed an annular packing ring 53 of any suitable conventional type.

It is advantageous to coat the threads of the differential screw means 21 and the splined portions 38 and 39 with a "permanent" type lubricant. It is also advantageous to provide suitable packing or sealing means to prevent foreign particles from entering the pulling tool and damaging the differential threads.

It will be obvious that, although only one embodiment of this invention is shown, various changes and modifications can be made in the details and arrangement of parts without departing from the scope of the invention as defined in the appended claims.

I claim:

1. For removing a piston disposed in a cylinder and connected to a piston rod, a device comprising tubular body means adapted to be connected to the piston, differential screw means within said tubular body means and including a power element having an axial bore therethrough, rod means extending through said axial bore and being axially slidable therein between a first position and a second position axially spaced from said first position away from the power element, said rod means abutting one end of said power element when in the first position for transmitting force tending to separate the piston and the piston rod, and locking means operable to retain said rod means in the second position for transmitting force from the piston rod to the power element and piston to aid in removal of the piston from the cylinder after the piston has been separated from the piston rod.

2. In a pulling device for removing a stuck member from an elongated supporting member,
the combination of
a tubular body adapted to be connected to the stuck member,
rod means extending coaxially through said body and having one end portion adapted to abut one end of the supporting member,
and differential screw means disposed within said tubular body and operable for exerting a force between said rod and said body which tends to separate the stuck member and the supporting member,
said rod means having another end portion exposed to be struck in order to impart a jarring force to the supporting member to aid in such separation;
said differential screw means including a tubular member surrounding a portion of said rod means and bearing axially against a portion of said rod means for transmitting a force to the supporting member
said tubular member being splined to said tubular body prevent relative rotation between said tubular member and said tubular body.

3. In a device for removing a piston from a piston rod;
a tubular outer body constructed to be connected to the piston and having internal threads;
a power element axially movable within said tubular outer body for transmitting a force tending to separate the piston from the piston rod,
said power element having external threads;
means connecting said power element and said tubular outer body to permit only relative axial movement between said power element and said tubular outer body;
a tubular differential screw element surrounding said power element and having internal threads engaging said external threads on said power element; and having external threads engaging said internal threads on said tubular outer body, the lead of said screw element internal thread being greater than the lead of said screw element external threads,
said tubular element having an end adapted for convenient rotational manipulation.

4. In a device for withdrawing a removable element from a shaft, the combination of
a tubular outer body constructed to be coupled to the removable element; and
differential screw means disposed within said device and including a power element axially movable within said tubular outer body in response to actuation of another portion of said differential screw means developing a force tending to separate the removable element from the shaft,
said power element and said outer body having a slidable connection which permits only relative axial movement therebetween;
said power element having an axial bore;
said device further comprising a sledging rod extending through said bore and having an end portion for transmitting force between said power element and the shaft;
the other end of said sledging rod extending axially beyond the exposed end portion of said differential screw means to provide an exposed surface that can be struck to impart a jarring force to aid in separation of the removable element and the shaft.

5. A device, as described in claim 4, wherein,
the slidable connection is provided by a spline engagement between the said power element and the said outer tubular body.

6. A device for removing a piston from a piston rod, comprising the combination of,
an adapter constructed to be connected to the piston;
a tubular outer body connected to said adapter; and
differential screw means disposed within said device,
said screw means including a power element axially movable within said tubular outer body in response to actuation of another portion of said differential screw means for developing a force tending to separate the piston from the piston rod,
said power element and said tubular outer body having a connection which permits only relative axial movement therebetween,
said differential screw means including a differential element having a threaded portion disposed between said outer body and said power element,
said differential element further having a portion extending axially beyond one end of said body and providing an exposed end portion whereby said differential end element can be rotated relative to said outer body and said power element;
said power element having an axial bore; and
a sledging rod extending through said bore and having an end portion for transmitting force between said power element and the shaft,
the other end of said sledging rod extending axially beyond the exposed end portion of said differential element to provide an exposed surface which can be struck to impart a jarring force to aid in separation of the piston and the piston rod.

7. A device for removing elements from one end of a shaft having an end face, comprising,
an outer body of tubular shape having an end adapted to be coupled to a removable element on the shaft,
said outer body having an opposite end,
said outer body having internal threads;
a cylindrical power element disposed within said outer body and having external threads,
said power element having a first end adjacent said shaft adapted to couple a force to said shaft when said outer body is coupled to a removable element;
means connecting said power element to said outer body to permit only relative axial movement therebetween;

a differential screw of tubular shape disposed between said outer body and said power element having external threads in engagement with said outer body internal threads and internal threads in engagement with said power element external threads;
   said differential screw having one end extending towards said outer body opposite end and adapted for convenient rotational manipulation.

8. A device as described in claim 7, wherein,
said power element has an axial bore;
said device further comprising a sledging rod extending through said bore and having an end portion for transmitting force between said power element and the shaft;
the other end of said sledging rod extending axially beyond the exposed end portion of said differential screw means to provide an exposed surface that can be struck to impart a jarring force to aid in separation of the removable element and the shaft.

9. A device for withdrawing a removable element from the end of a movable shaft and from within a housing that closely surrounds the removable element, comprising,
means adapted to engage the removable element and the shaft,
   said engaging means being operable to develop a force for separating the removable element and said shaft,
     said engaging means including a power element for coupling force to the shaft;
means operably connected to said engaging means and including a member slidable in said power element and having an end disposed for movement from a first position to a second position to engage the shaft;
means cooperating with said engaging means to retain said member in said second position with said end spaced from said first position towards the shaft end to couple a force produced by the movement of the shaft to the engaging means and thereby withdraw the removable element from within the housing.

10. In a device for removing a piston disposed in a cylinder and connected to a piston rod, the combination of, body means adapted to be connected to the piston;
rod means supported within said body means and adapted to engage the piston rod;
differential screw means connected between said body means and said rod means operable to develop a force for separating the piston and the piston rod,
said rod means being movable within said body means between two alternative positions; and
means for securing said rod means in said two alternative positions against axial movement relative to said body means when the piston rod is in force contact with the rod means.

11. A device for removing a piston from a piston rod, comprising,
an outer body of tubular shape adapted to be connected to the piston;
differential screw means disposed within said device and including a power element axially movable within said tubular body in response to actuation of another portion of said differential screw means developing a force tending to separate the piston from the piston rod,
   said power element having an axial bore;
a sledging rod extending through said bore and having an end portion for transmitting force between said power element and the piston rod;
   the other end of said sledging rod extending axially beyond the exposed end portion of said differential screw means to provide an exposed surface that can be struck to impart a jarring force to aid in separation of the piston and the shaft;
retaining means integrally connected with said differential screw means to prevent axial movement of said sledging rod relative to said outer body upon engagement of said rod end portion with the piston rod in one position of said sledging rod and to prevent axial movement of said sledging rod upon engagement of said rod end portion with the piston rod relative to said outer body in a second position of said sledging rod, spaced further from said power element than said first position.

12. The device as described in claim 11, wherein,
said differential screw means further comprises a member of tubular shape having external threads in engagement with internal threads of said outer body and internal threads in engagement with external threads on said power element, and enclosing said sledging rod,
   said member extending axially toward the exposed end portion of said outer body for convenient manipulation;
said retaining means comprising a slot in said member and a pin on said sledging rod to secure said sledging rod in said second position,
   the end portion of said rod abutting the power element to secure said sledging rod in said first position.

References Cited in the file of this patent
UNITED STATES PATENTS

| | | |
|---|---|---|
| 1,121,101 | Hersee | Dec. 15, 1914 |
| 1,412,180 | Holmes | Apr. 11, 1922 |
| 1,441,963 | Bullis | Jan. 9, 1923 |
| 1,472,388 | Finch | Oct. 30, 1923 |
| 1,658,896 | Hays | Feb. 14, 1928 |
| 1,746,535 | Key | Feb. 11, 1930 |
| 1,782,303 | Imlach | Nov. 18, 1930 |
| 1,807,329 | West et al. | May 26, 1931 |
| 2,421,324 | Graham | May 27, 1947 |
| 2,487,902 | Stout et al. | Nov. 15, 1949 |
| 2,924,005 | Wilson et al. | Feb. 9, 1960 |

FOREIGN PATENTS

| | | |
|---|---|---|
| 120,557 | Australia | Nov. 5, 1945 |
| 148,705 | Great Britain | Aug. 5, 1920 |